JAMES H. RICHARDSON.
Improvement in Animal and Game Traps.
No. 114,343. Patented May 2, 1871.
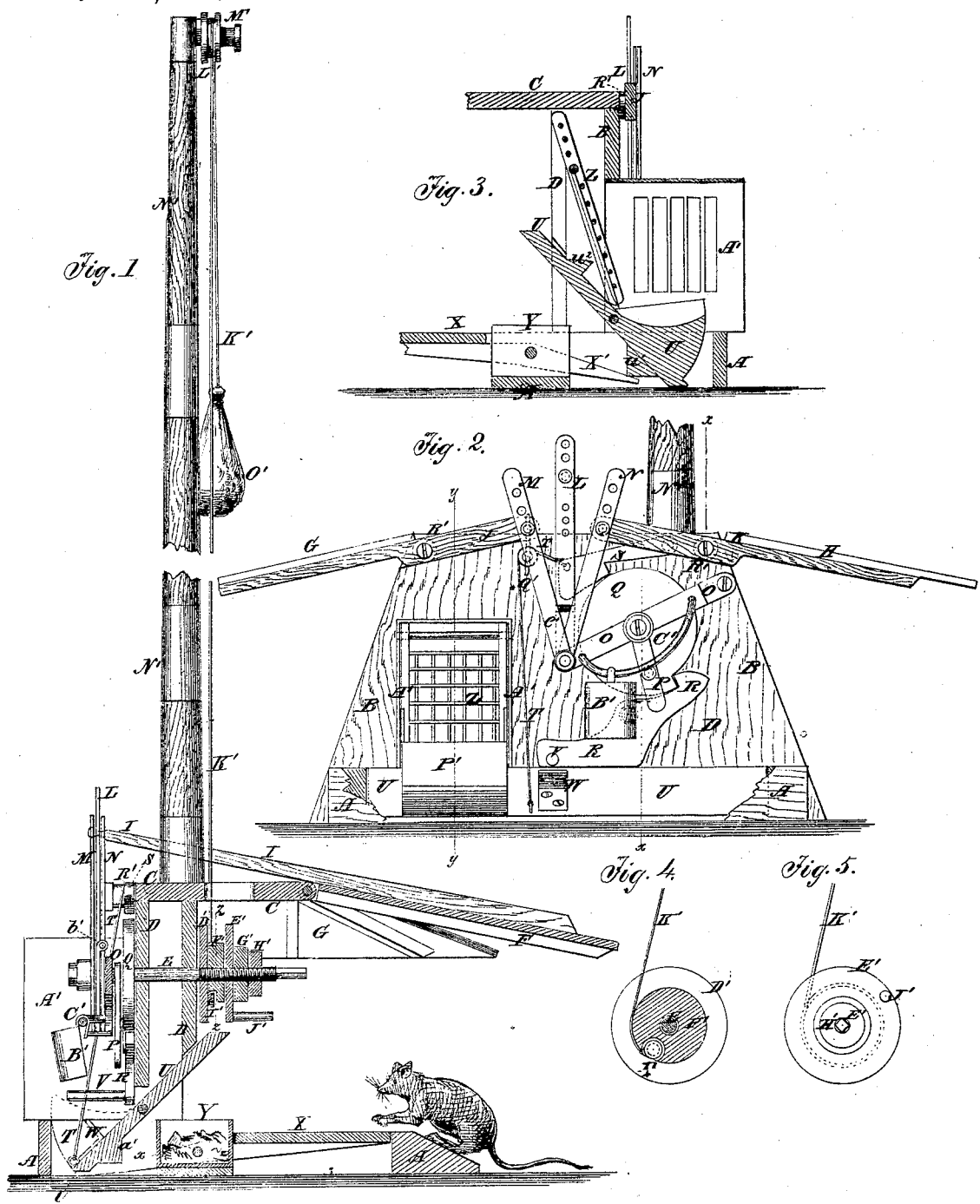

United States Patent Office.

JAMES H. RICHARDSON, OF WESTPORT, MISSOURI.

Letters Patent No. 114,343, dated May 2, 1871.

IMPROVEMENT IN ANIMAL AND GAME-TRAPS.

The Schedule referred to in these Letters Patent and making part of the same.

*To all whom it may concern:*

Be it known that I, JAMES H. RICHARDSON, of Westport, in the county of Jackson and State of Missouri, have invented a new and useful Improvement in Animal and Game-Trap; and I do hereby declare that the following is a full, clear, and exact description thereof, which will enable others skilled in the art to make and use the same, reference being had to the accompanying drawing forming part of this specification.

Figure 1 is a detail vertical section of my improved trap taken through the line $x$ $x$, fig. 2.

Figure 2 is a front view of the same, parts being broken away to show the construction.

Figure 3 is a detail sectional view of the same taken through the line $y$ $y$, fig. 2.

Figure 4 is a detail sectional view taken through the line $z$ $z$, fig. 1.

Figure 5 is a detail view of the cord-drum.

My invention has for its object to improve the construction of my improved animal-trap, for which a patent was allowed April 23, 1870, so as to make it more convenient and effective in operation; and It consists in the construction and combination of various parts of the trap, as hereinafter more fully described.

A is the bottom or base-frame of the trap, to the rear edge of which is attached a vertical frame, B.

C is the top of the trap, which is made smaller than the bottom A, and which is securely attached to the upper edge of the vertical frame B.

To the upper part of the vertical frame B, beneath the top C, is attached a box or casing, D, to inclose a coiled spring, one end of which may be secured to a bolt attached to the said box or casing D, and the other end to the shaft E that revolves in bearings in the side of the box D and in the frame B.

F is the front, and

G H are the end shutters, which are pivoted or hinged at their upper edges to the top C, and the adjacent edges of which are made inclined, so that when closed down against the edges of the bottom A they may be inclined something like a roof, and so that the front shutter can be raised to give access to the bait-box and the interior of the trap.

I J K are levers attached to the shutters F G H, the free ends of which, when the said shutters are raised, nearly meet.

The free ends of the levers I J K are detachably and adjustably pivoted to the upper parts of the connecting-bars L M N, the lower ends of which are pivoted to the free end of the lever O, the other end of which is pivoted to the vertical frame D near one edge.

The bar L has a hinge, $l$, formed in it, near its lower end, to give freedom of motion to the front shutter F as the trap is being operated.

To the middle part of the lever O is pivoted the upper end of the bar P, the lower end of which is pivoted to the wheel Q attached to the outer end of the shaft E by means of a crank-pin.

Several holes may be made in the wheel Q, at different distances from its center, so that by adjusting the position of said crank-pin the shutters F G H may be raised more or less when the trap is set. By removing the said crank-pin from the bar P and replacing it in the wheel Q it furnishes a convenient means for winding up the trap.

Upon the edge of the wheel Q is formed a cam or projecting tooth, which, at each half revolution of the wheel Q, catches alternately upon the hooks or shoulders of the triggers or levers R S to lock the shutters F G H, alternately, open and closed.

The levers or triggers R S are pivoted to the vertical frame B, the lever S above and the lever R below the wheel Q.

The upper lever S is made light, so as not to be too heavy to be raised easily away from the tooth of the wheel Q, and has a pin attached to its lower end to receive one end of a cord, T, which passes over a guide-pulley pivoted to the upper part of the vertical frame B, and its other end is attached to the trip-board U, so that the lever S may be raised by the downward movement of said trip-board.

The lower lever R is made heavier, so that its own weight may hold it up against the edge of the wheel Q ready to catch upon the teeth of said wheel.

The lower edge of the lever R is made straight, so that it may sit square upon the trip-board U.

V is a pin projecting from the lower end of the lever R for a plate or arm, W, attached to the trip-board U to strike against to remove its upper end from the tooth of the wheel Q.

The trip-board U is pivoted to the bottom A or to the lower edge of the vertical frame B.

To the lower part of the bottom of the trip-board U is attached a strip, $u^1$, which rests upon the projecting arms $x'$ of the drop X, so that when the said drop is forced down by the weight of the animal the board may be operated to trip the trap, and, at the same time, its upper part may move down over the bait-box Y to prevent the animal from ever getting at the bait, in which position it is held by the gate Z, pivoted in the passage-way A' leading to the cage, until the said gate is raised by the animal seeking to escape through the said passage-way A'.

The trip-board U then drops, uncovering the bait-box and raising the lever S, allowing the shutters to be again raised by the weight or spring, resetting the trap.

B' is a weight-box swung from the curved wire C', the ends of which are attached to the lever O near its ends.

By this arrangement, as the shutters are lowered the weight moves toward the pivoted end or fulcrum of the said lever to allow the shutters to be held more firmly closed; and as the shutters are raised the said weight moves toward the free end of the said lever to more evenly balance the said shutters.

The weight may also be swung from the pivot of bar P in the center of the lever O, which weight, in case a sack be used, may be kept out from the wheel Q by the wire G'.

The passage-way A' is made of tin or sheet-iron, and is secured to the rear side of the trap, over the opening in said rear side, by the same wire that pivots the gate Z in said opening. The passage-way A' should have windows upon one or both sides to give light to the animal and encourage him to raise the gate Z and pass through the said passage-way into a dark cage arranged at the other end of the passage-way, the spikes upon the bottom of the gate preventing his return, even should he be so disposed, after he has once commenced the passage.

The lower end of the gate Z rests against a strip, $u^2$, attached to the trip-board U to prevent the animal from pushing the gate back; and should he succeed in raising the said gate his weight upon the trip-board U will at once close the shutters so that he cannot escape.

Upon the inner end of the shaft E is cut a screw-thread, upon which are screwed two wheels, D' E', and three or more washer-nuts, F' G' H'.

The inner wheel D' has an extra hole formed in it, in which is secured a pin, I', to receive the end of the weight-cord.

The outer wheel E' has an extra hole formed in it to receive a pin, J', to serve as a crank for winding up the cord when the weight and spring are not attached.

One or more washers, F', are placed upon the shaft E between the two wheels D' E' for the weight-cord to be wound upon, and which, or the inner one of which, is or are notched to receive the pin I', as shown in figs. 1 and 4.

G' are one or more washers screwed upon the shaft E upon the outer side of the wheel E', and which may be placed between the wheels D' E' when it may be desired or necessary to lengthen the weight-cord.

H' is the nut by which the wheels D' E' and washers F' G' are locked upon the said shaft E. The washers F' G' may be made of a larger or smaller diameter, according to the amount of weight to be used.

K' is the weight-cord, which is attached to the pin I' of the wheel D', is wound upon the washers F' or F' G', and passes up through a slot in the top C, said slot being directly above and parallel with the shaft E.

The cord K' passes over a pulley, L', pivoted to the screw M', which is made long to allow the pulley to move out and in as the cord K' moves back and forth upon the washers F'.

The screw M' may be secured to the top of a post, N', or it may be secured to the ceiling of a room or to a limb of a tree or to any other convenient support of sufficient height.

To the other end of the cord K' is attached a weight, O'.

By this construction the mechanism of the trap may be operated by a weight or a spring, or by both acting together.

P' is a block fastened to the upper side of the lower part of the trip-board U, to project upward into the passage-way A' to make the lower part of said passage-way close, so that the animal cannot get out at the sides or bottom of the said passage-way. The block P' also weights the trip-board U to make it operate the mechanism promptly to reset the trap.

Q' is a wire guard to keep the cord T in its place upon its guide or guide-pulley.

The lower end of the guard-wire Q' also serves as a stop or catch to hold down the lever P of the shutter G when detached from the bar M, for convenience in showing the working of the trap.

R' are washers placed upon the pivots of the levers J K, between said levers and the vertical frame B, so that the outer sides of said levers may be upon a line with the outer surface of the wheel Q.

It should be observed that one, two, or all the shutters F G H may be used as may be required, according to the character of the animal trapped for

Having thus described my invention,

I claim as new and desire to secure by Letters Patent—

1. The arrangement of the lever O, upper trigger or lever S, cord T, lower trigger or lever R, curved wire C' and weight-box or sack B', in connection with the bar P, wheel Q, bars L M N, and trip-board U, said parts being constructed and operating substantially as herein shown and described, and for the purpose set forth.

2. The arrangement of the drop or step-board X $x'$ and bait-box Y, in connection with the trip-board U $u^1$ and projecting-plate or arm W for tripping the lever or trigger B to spring the trap, substantially as herein shown and described.

3. The gate Z, passage-way A', and block P', constructed and arranged in connection with the trip-board U, substantially as herein shown and described, and for the purpose set forth.

4. The wheels D' I' and E' J', washers F' G', (one or more,) and nut H', in combination with the shaft E and weight-cord K', substantially as herein shown and described, and for the purpose set forth.

5. The trip-board U and its attachments $u^1 u^2$ P', in combination with the other parts of the trap, substantially as herein shown and described, and for the purpose set forth.

JAMES H. RICHARDSON.

Witnesses:
 GEO. W. LOVE,
 THOMAS MCMINN.